US008295445B2

(12) United States Patent
Nguyen et al.

(10) Patent No.: US 8,295,445 B2
(45) Date of Patent: Oct. 23, 2012

(54) AUTOMATIC EMERGENCY CALL NOTIFICATION TO PRE-DESIGNATED PERSONAL EMERGENCY CONTACTS

(75) Inventors: Brandon Nguyen, Renton, WA (US); Elisabeth Townsdin, Seattle, WA (US)

(73) Assignee: TeleCommunication Systems, Inc., Annapolis, MD (US)

( * ) Notice: Subject to any disclaimer, the term of this patent is extended or adjusted under 35 U.S.C. 154(b) by 1351 days.

(21) Appl. No.: 11/898,237

(22) Filed: Sep. 11, 2007
(Under 37 CFR 1.47)

(65) Prior Publication Data
US 2008/0304630 A1    Dec. 11, 2008

Related U.S. Application Data

(60) Provisional application No. 60/843,507, filed on Sep. 11, 2006.

(51) Int. Cl.
*H04M 11/04* (2006.01)
(52) U.S. Cl. ............... 379/41; 379/40; 379/45; 379/47; 379/211.04
(58) Field of Classification Search ............... 379/37–51
See application file for complete search history.

(56) References Cited

U.S. PATENT DOCUMENTS

| 5,933,080 | A  | * | 8/1999 | Nojima | 340/426.19 |
| 7,522,038 | B2 | * | 4/2009 | Edwards et al. | 340/539.1 |
| 2001/0009577 | A1 | | 7/2001 | Orwick et al. | |
| 2003/0012344 | A1 | * | 1/2003 | Agarwal et al. | 379/37 |
| 2004/0203622 | A1 | | 10/2004 | Esque et al. | |
| 2005/0151642 | A1 | * | 7/2005 | Tupler et al. | 340/539.18 |
| 2005/0197096 | A1 | | 9/2005 | Yang et al. | |
| 2006/0062354 | A1 | | 3/2006 | Contractor | |
| 2006/0133582 | A1 | * | 6/2006 | McCulloch | 379/45 |
| 2007/0064882 | A1 | * | 3/2007 | Ger et al. | 379/33 |

FOREIGN PATENT DOCUMENTS

WO    PCTUS2007/19672    9/2007

OTHER PUBLICATIONS

International Search Report from PCT/US2007/19672 dated Oct. 23, 2007.
International Search Report from PCT/US2007/19672 dated Mar. 12, 2008.
European Search Report from 07837979.9 dated Jun. 8, 2011.

* cited by examiner

*Primary Examiner* — Yuwen Pan
*Assistant Examiner* — Ibraham Sharifzada
(74) *Attorney, Agent, or Firm* — William H. Bollman

(57) ABSTRACT

Automatic notification is provided to pre-designated emergency contacts for a given wireless subscriber upon the occurrence of an emergency call from the subscriber. Triggering for the automatic notification may take place at an appropriate time in the emergency call, e.g., at a time the emergency call is received, at a time during the emergency call after a current location of the emergency caller is obtained by the emergency network, once the emergency call terminates, after a set amount of time after the emergency call is received, terminates, etc. The automatic notification is preferably made using voice over Internet Protocol (VoIP), but may instead be pre-designated by the subscriber to be in an alternative mode, e.g., by SMS, switched telephone, etc. An option is included for the emergency caller to cancel the automatic notification. The location of the emergency caller may be configurably provided to a notified emergency contact.

18 Claims, 4 Drawing Sheets

AUTOMATIC EMERGENCY CALL NOTIFICATION TO PRE-DESIGNATED PERSONAL EMERGENCY CONTACTS

This application claims priority from U.S. Provisional Patent Application No. 60/843,507, filed Sep. 11, 2006, entitled "Automatic Emergency Call Notification To Pre-Designated Personal Emergency Contacts" to Nguyen et al., the entirety of which is expressly incorporated herein by reference.

BACKGROUND OF THE INVENTION

1. Field of the Invention

This invention relates generally to wireless telecommunications. More particularly, it relates to cellular subscriber add-on services (voice and short message system (SMS)), applicable to voice over Internet protocol (VoIP) networks.

2. Background of the Related Art

When a wireless phone subscriber is involved in an emergency event, family, friends and loved ones will likely be concerned. If the subscriber is disabled in the emergency event, many times proper notification to the family, friends and loved ones is at best significantly delayed, if made at all. Additionally, if a loved one begins to suspect that the wireless subscriber may have been in an emergency event, perhaps because of the significantly delayed arrival, the loved one may not know the general location of the wireless subscriber, especially if the subscriber is traveling. This can be a frustrating and heartbreaking experience for the loved one who does not know which police department, highway patrol, or hospital(s) to query for information about the subscriber's well being. Moreover, important time for both the loved one searching for the subscriber as well as the responders (e.g., public safety answering point (PSAP), police, hospital, etc.) is wasted during search efforts.

FIG. 4 shows relevant portions of a conventional emergency call made from a subscriber phone.

In particular, as shown in FIG. 4, a subscriber 300 makes a 911 call, which is routed via an existing 911 call solution 302. For instance, if the subscriber 300 is making the call via a landline telephone, then the 911 call will be routed via switched telephone technology to an appropriate public safety answering point (PSAP). If, on the other hand, the subscriber 300 is a wireless phone, the actual location of the subscriber 300 may not be accurately known, and so the 911 call might be routed to an emergency call center, which in turn determines an appropriate PSAP.

Conventional personal emergency response monitoring services attempt to solve this type of problem. With a conventional personal emergency response monitoring service, a subscriber purchases a monitoring device for use exclusively in the subscriber's home. Then, during an emergency event, the subscriber uses the device to contact the call center of their personal emergency response monitoring service. The call center of the personal emergency response monitoring service handles the call directly, and contacts emergency services or loved ones that the monitoring service deems necessary.

According to these conventional systems, contact people are designated in advance by the subscriber, and are called by the monitoring service at the time of an emergency. If at the time of the emergency no responder can be contacted, emergency medical dispatchers at the monitoring service would notify an appropriate police department, ambulance company or fire department about the emergency situation.

For instance, one personal emergency response monitoring service is provided by Lifecare Ambulance Service™ (http://www.lifecareems.org/pers.htm). Such conventional systems are a personal alert system for emergency situations allowing a person, e.g., who is physically unable to seek help in more traditional ways, to contact trained emergency medical dispatchers with the touch of a single button. When the help needed button is activated, emergency medical dispatchers first talk to the subscriber to determine what the problem is. If the subscriber does not answer, contact is made by the monitoring service with a friend, relative, or neighbor who can help.

Personal emergency response monitoring services generally utilize private, third-party vendors that may not be held to proven, government-approved 911 infrastructures. For instance, personal emergency monitoring services 911 alerts go directly to the vendor, often bypassing routing to the government-approved and supported public safety answering points (PSAPs), which have the best training to handle an emergency and contact the appropriate responder(s), e.g., fire, medical, police, etc.

Moreover, conventional personal emergency monitoring services typically do not function fully or well for wireless (portable) subscribers. For instance, conventional personal emergency monitoring services do not have the benefit of position determining equipment (PDE) and/or a global positioning system (GPS) to pin-point the current location of an emergency wireless or otherwise mobile caller, including those calls coming over the Internet (e.g., voice over Internet Protocol (VoIP)).

Perhaps most significantly, the present inventors have realized that conventional personal emergency monitoring services do not immediately notify loved ones upon occurrence of an emergency event. In fact, many if not most times notification to loved ones of the emergency event may not be made at all by the called service. Furthermore, conventional personal emergency monitoring usually requires purchase of a new electronic device, and focuses on a small market segment consisting of seniors and/or chronically ill parties.

There is a need for a generally better technique and apparatus for automatically contacting a wireless subscriber's family and/or loved ones upon occurrence of an emergency event.

SUMMARY OF THE INVENTION

In accordance with the disclosed embodiments, a method of automatically notifying a pre-designated emergency contact relating to an emergency call comprises receiving an emergency call from a given subscriber. At least one pre-designated emergency contact to be automatically contacted subsequent to the receipt of the emergency call is determined. A notification message to be sent to the at least one pre-designated emergency contact is generated. The generated notification message is sent to the at least one pre-designated emergency contact.

BRIEF DESCRIPTION OF THE DRAWINGS

Features and advantages of the present invention will become apparent to those skilled in the art from the following description with reference to the drawings.

DETAILED DESCRIPTION OF ILLUSTRATIVE EMBODIMENTS

Figure 1:
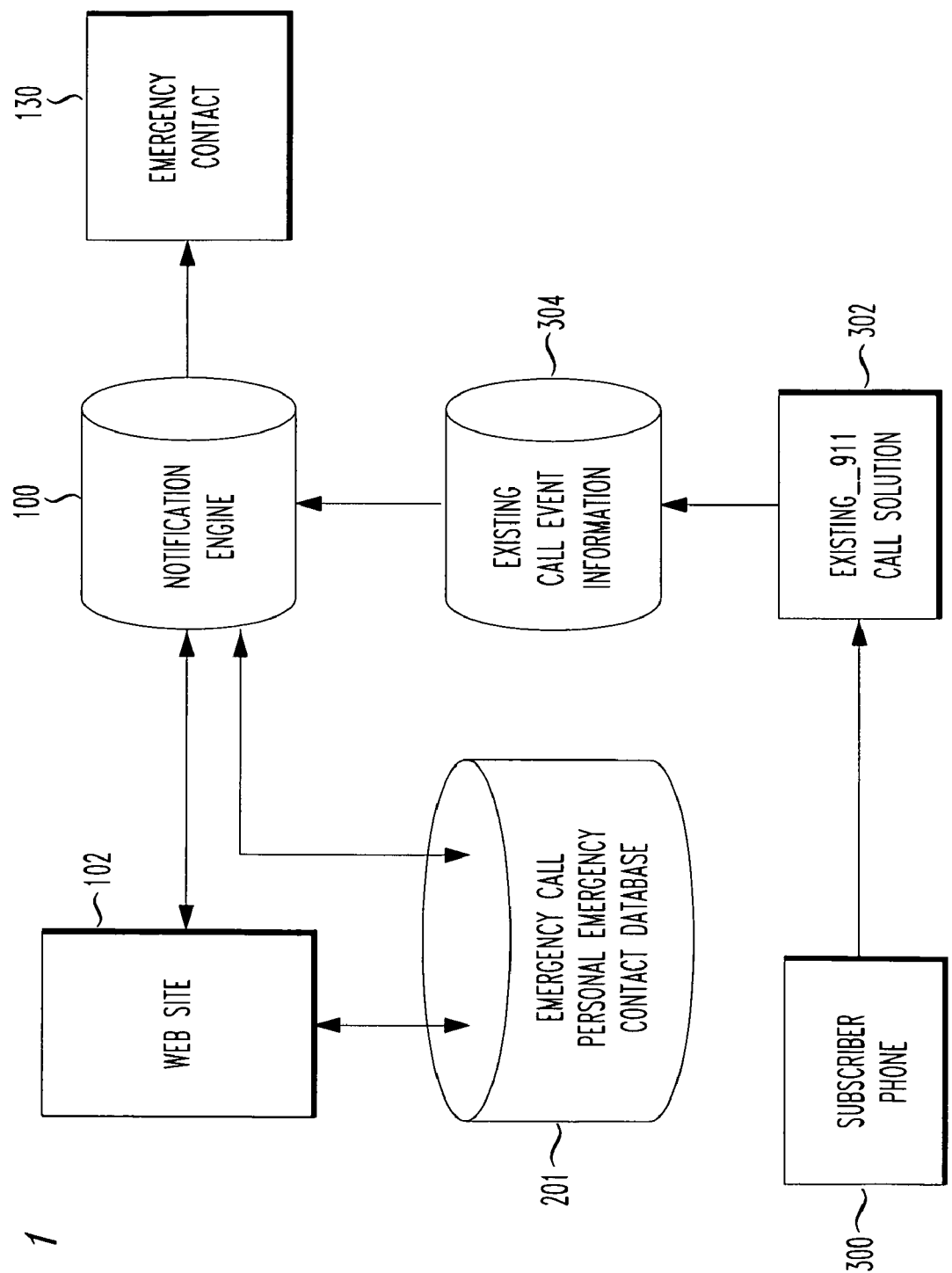
FIG. 1 shows relevant portions of an automatic emergency call notification to pre-designated personal emergency contacts, in accordance with embodiments of the present invention.

The present invention generates automatic notification in an emergency event to one or more pre-designated friend or loved one of the emergency caller, allowing them to get involved as necessary or desired, e.g., to provide appropriate emergency responders with life-saving information relating to the emergency victim. In preferred embodiments, the emergency notification includes a location of the emergency victim, making it possible for the friend or loved one to quickly locate the emergency victim.

Life saving information that would be particularly helpful if quickly obtained by emergency personnel from those that are automatically notified might include, e.g., that the emergency victim has a pre-existing condition, or a drug allergy. The life saving information might be the kind that only a few people such as the person that is automatically notified would even know about.

The automatic notification also permits those that are notified to begin preparations as a result of the emergency. For instance, a notified husband might leave work immediately to gather the couple's children; a supervisor of the emergency victim might immediately attempt to cover for the emergency victim; etc.

In accordance with the disclosed embodiments, automatic notification is provided to pre-designated emergency contacts for a given wireless subscriber upon the occurrence of an emergency call from the subscriber. Triggering for the automatic notification may take place at an appropriate time in the emergency call, e.g., at a time the emergency call is received, at a time during the emergency call after a current location of the emergency caller is obtained by the emergency network, once the emergency call terminates, after a set amount of time after the emergency call is received, terminates, etc.

The disclosed embodiments integrate a pre-designated emergency contact solution into otherwise conventional 911 infrastructure. If an emergency call event occurs, contact is initiated with any/all emergency contacts pre-identified by the subscriber and stored in an appropriate database accessible by a notification engine.

The automatic notification is preferably made using voice over Internet Protocol (VoIP), but may instead be pre-designated by the subscriber to be in an alternative mode, e.g., by SMS, switched telephone, etc.

When notifying an emergency contact pre-designated by the emergency caller/subscriber, a general notification disclaimer may preferably be included to those notified to prevent them from undue alarm.

Preferably, an option is included for the emergency caller/subscriber (e.g., wireless subscriber) to override and/or cancel the automatic notification to any or all pre-designated emergency contacts. This cancellation may be activated at the start of the emergency call, or in response to a prompt from the service provider during the emergency call itself. For safety purposes, the prompt may be established as a reverse prompt, meaning that if cancellation is not confirmed the notifications will automatically be sent to pre-designated emergency contacts.

Position determining equipment (PDE) and/or global positioning system (GPS) integrated support is preferably used to pin-point the location of an emergency caller. Preferably, the location may be configurably provided to those people that were automatically notified.

FIG. 1 shows relevant portions of an automatic emergency call notification to pre-designated personal emergency contacts, in accordance with embodiments of the present invention.

In particular, as shown in FIG. 1, an automatic emergency call notification system includes a user interface to allow a would-be emergency call subscriber to pre-register or pre-designate one or more friend(s) or loved one(s) that will be notified when they use their subscriber phone to place an emergency call. In given embodiments, the user interface is a website 102 accessible by the subscriber, to enter or pre-designate one or more personal emergency contacts that the subscriber wants contacted in the event that an emergency 911 call is placed by the subscriber.

The contact phone number, universal resource locator (URL) or other unique contact information for pre-designated personal emergency contacts and related information is stored in an emergency call personal emergency contact database 201. Entries in the emergency call personal emergency contact database 201 are established and revised via access by the user interface, e.g., website 102.

In some embodiments, a preferred mode or method of communication may be stored or otherwise associated with one or more entries in the emergency call personal emergency contact database 201. For instance, a preferred mode may be VoIP with a recorded message being routed to the notified emergency contacts. Another preferred mode may be via short message with text (SMS). Yet another preferred mode of communication may be via email. The email may be merely textual, or may include an audio or video stream containing the notification message.

FIG. 1 includes depiction of a subscriber phone 300, an existing 911 emergency call solution 302, and existing callEvent information 304, as is otherwise conventionally known. However, FIG. 1 importantly adds a notification engine 100 in communication with the emergency call personal emergency contact database 201. The notification engine 100 receives otherwise conventional existing callEvent information 304, and as a result at the appropriate time automatically initiates notification message(s) to pre-designated emergency contacts via preferred communication methods.

The notification engine 100 is activated when an emergency call is made by a subscriber that the notification engine 100 is responsible for. The notification engine 100 is responsible for automatically generating notification message(s) as directed by matching entries in the emergency call personal emergency contact database 201.

Upon receipt of callEvent information relating to an emergency 911 call from a subscriber 300, the notification engine 100 accesses the emergency call personal emergency contact database 201 to determine if the emergency call originates from a registered subscriber. If the notification engine 100 finds a matching entry in the emergency call personal emergency contact database 201, then the notification engine 100 generates and automatically routes notification message(s) to any/all pre-designated personal emergency contacts 130 pre-designated in the matching entry in an appropriate manner (e.g., via VoIP with a recorded message, via short message, via email, etc.), as directed by information contained in the matching entry.

Figure 2:
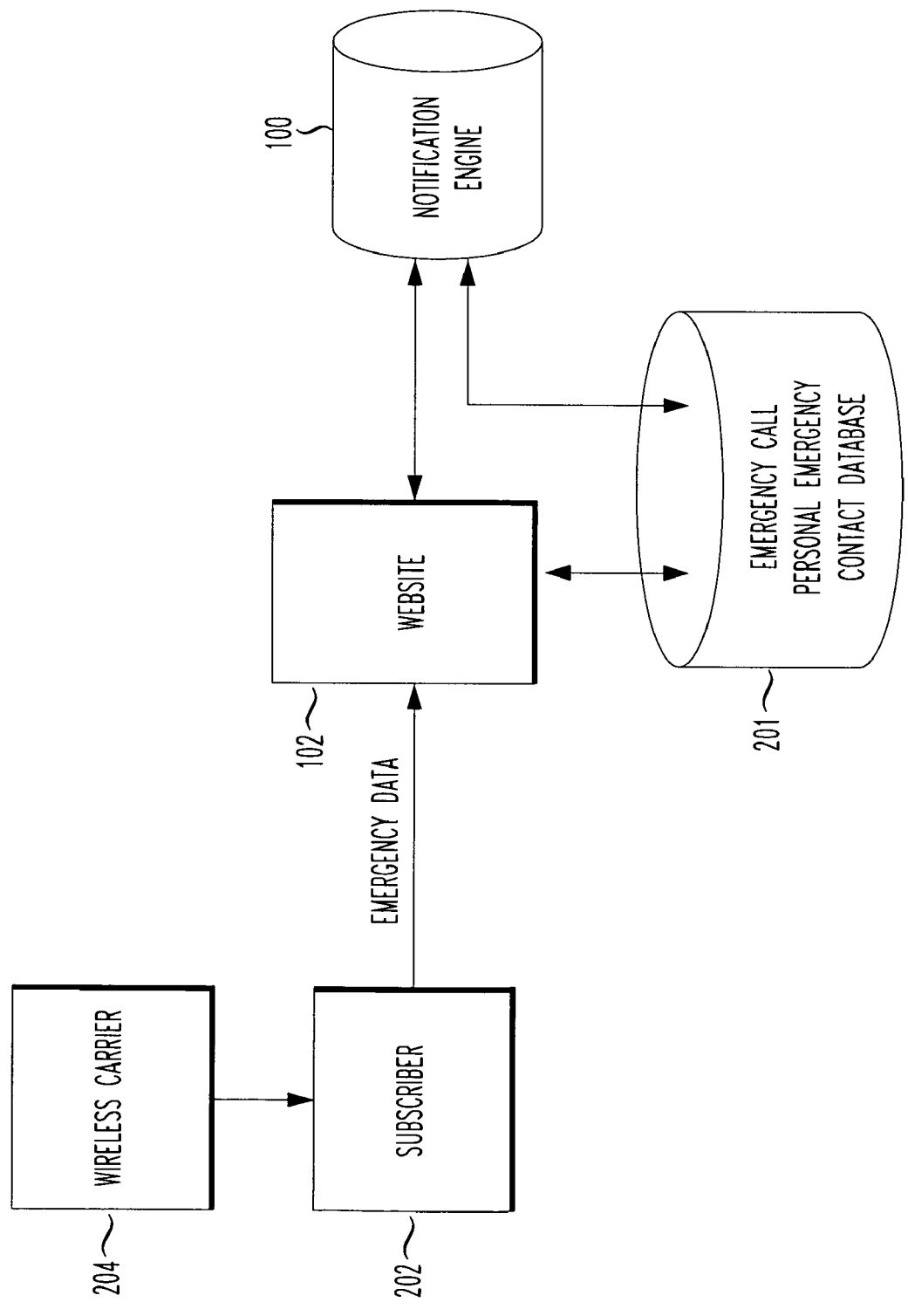
FIG. 2 shows relevant portions and message flow allowing a subscriber to pre-designate personal emergency contacts and storage of the pre-designated emergency contacts to be notified in the event of an emergency call, in an emergency call personal emergency contact database, in accordance with embodiments of the present invention.

FIG. 2 shows relevant portions and message flow allowing a subscriber to pre-designate personal emergency contacts and storage of the pre-designated emergency contacts to be notified in the event of an emergency call, in an emergency call personal emergency contact database, in accordance with embodiments of the present invention.

In particular, as shown in FIG. 2, a wireless carrier or other service provider 204 may market to its subscriber 202 an automatic emergency call notification service in accordance with the principles of the present invention. Or, the subscriber 202 may be notified about the availability of the automatic emergency call notification service by advertisement from a third party vendor of the automatic emergency call notification service. In any event, a given subscriber (that will later make an emergency call from the relevant phone such as a Voice Over Internet Protocol (VoIP) phone) registers themselves for automatic notification service, and pre-designates at least one emergency contact (e.g., a configurable limit of up to three, up to five, unlimited, etc.) to notify in case of an emergency call. The pre-designation preferably includes a preferred mode of notification, if configurable, as well as the unique address of the emergency contact using that preferred mode (e.g., phone number, SMS address, email address, URL, etc.)

In the disclosed embodiments, a subscriber 202 registers themself by accessing a website 102 at some time before the need for the emergency call arises. The would-be emergency caller may designate, edit or delete personal emergency contacts maintained in the emergency call personal emergency contact database 201 at any time via the user interface, preferably (but not necessarily) even during or after an emergency call is placed. Of course, establishing one or more emergency contacts well before the need for them during an emergency call will greatly improve the ability of the emergency contact to help during a debilitating emergency.

Preferably the subscriber 202 uses an online registration form on the website 102 to pre-designate the desired emergency contacts to be automatically notified in the event that an emergency call is placed from the serviced phone. For each emergency contact, the online registration form preferably requires relevant contact phone numbers, SMS address, email address, URL addresses, etc. necessary to contact them via the desired contact mode. Contemplated is the ability to send more than one notification message to a given emergency contact using multiple communications methods. For instance, a subscriber may pre-designate an emergency contact that is to be automatically notified using multiple methods such as a phone call, email and SMS message, upon receipt of an emergency call, to give a better chance of getting in touch with the emergency contact faster.

Preferably the online registration form is simple in nature, e.g., requiring less than 2 minutes of time from the subscriber 202.

Calls to pre-designated emergency contacts is initiated by the notification engine 100 upon receipt by the notification engine 100 of CallEvent information relating to an emergency call from a given subscriber, or shortly thereafter. Thus, whatever emergency contacts are associated with a given subscriber in the emergency call personal emergency contact database at the time that the notification engine 100 receives CallEvent information relating to a given subscriber, are the emergency contacts that will be automatically contacted as a result of that emergency call.

Figure 3:
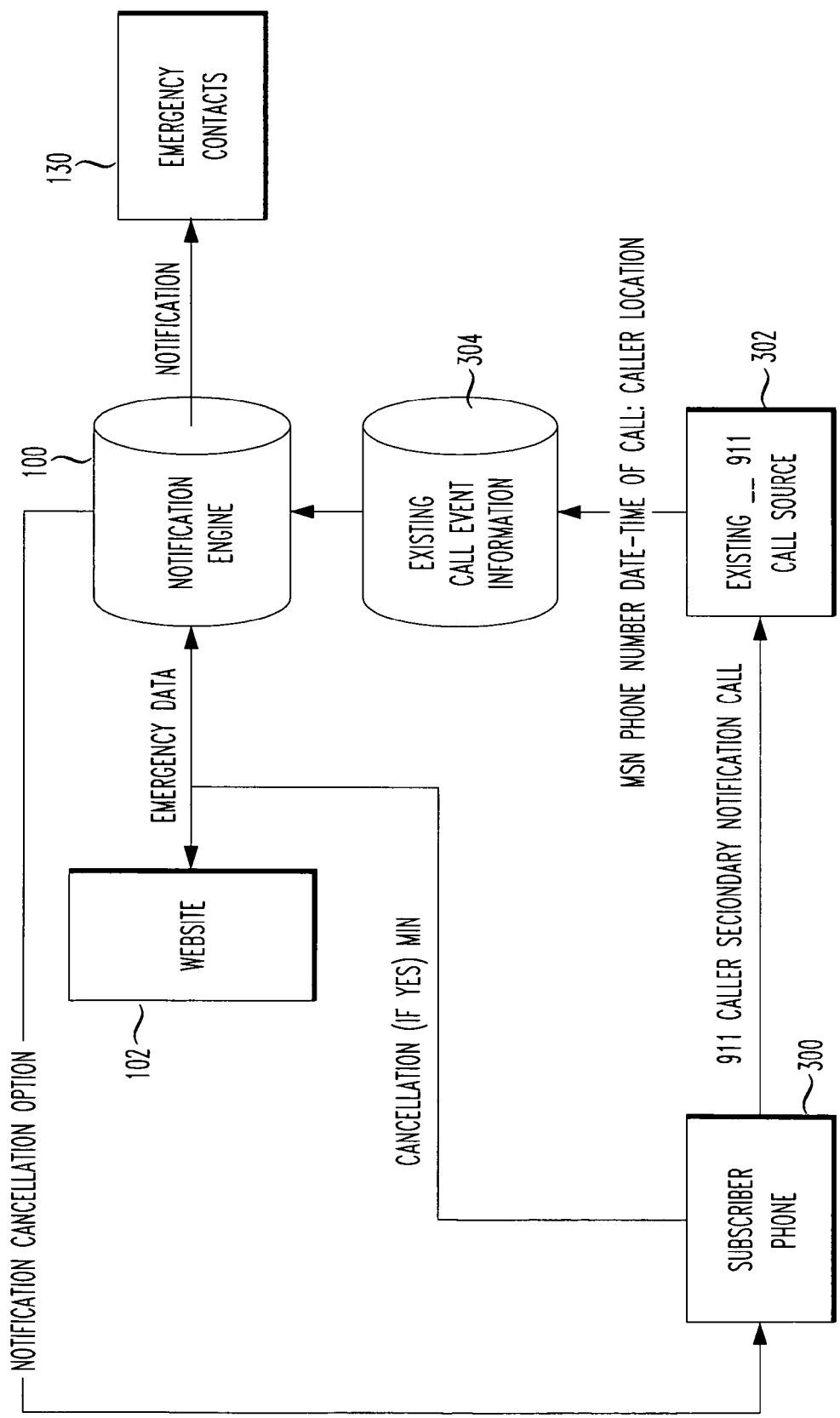
FIG. 3 shows exemplary message flow relevant to emergency call notification to a subscriber's personal emergency contact(s), in accordance with embodiments of the present invention.
Figure 4:
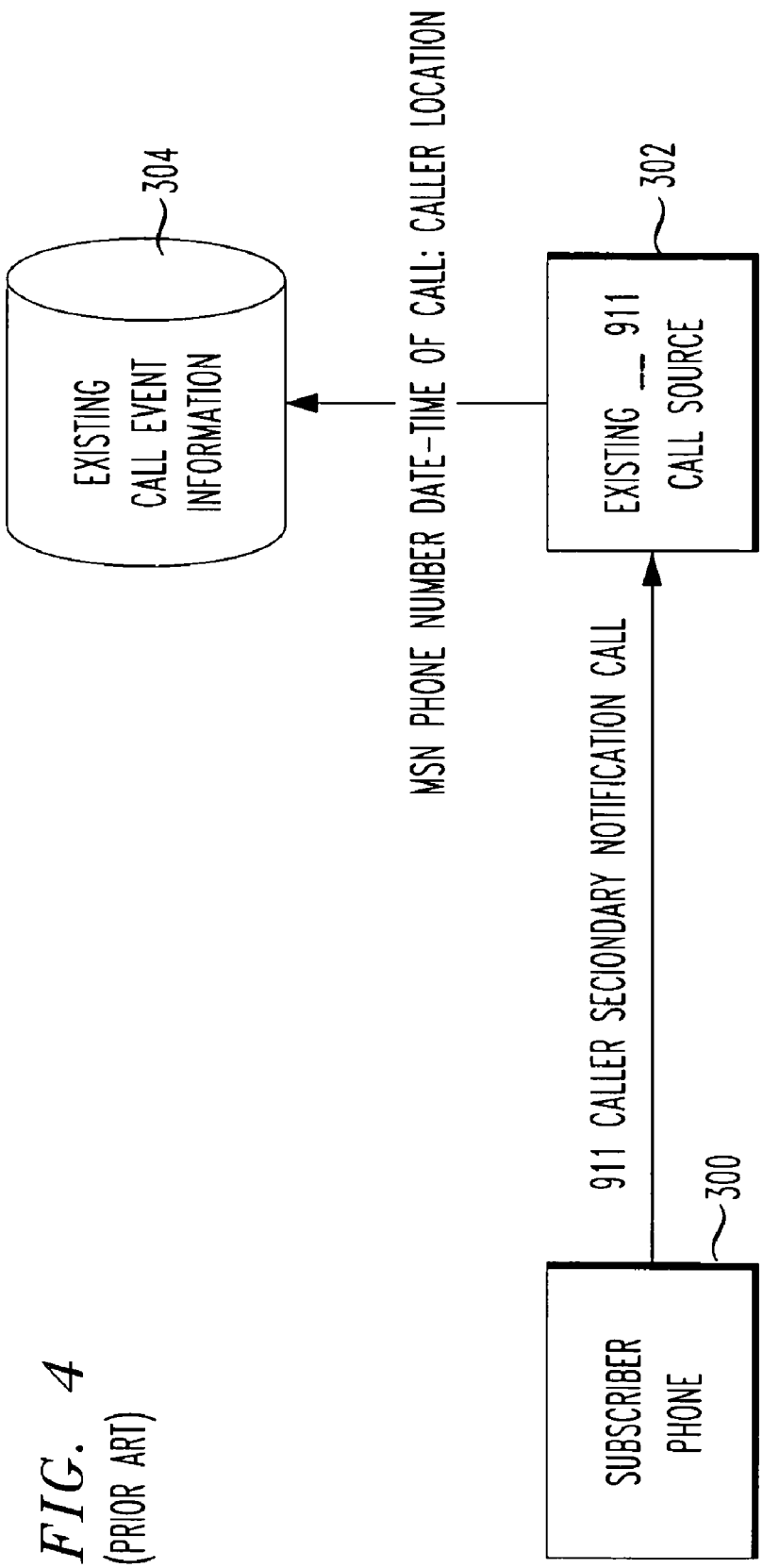
FIG. 4 shows relevant portions of a conventional emergency call made from a subscriber phone.

FIG. 3 shows exemplary message flow relevant to emergency call notification to a subscriber's personal emergency contact(s), in accordance with embodiments of the present invention.

In particular, as shown in FIG. 3, when an emergency 911 call is made from the subscriber's phone 300, the caller's call phone number, MIN (Mobile Identification Number) and physical location is collected and provided to the notification engine 100 as CallEvent information via an otherwise conventional 911 call solution platform 302.

If the subscriber's phone 300 is not used to place the emergency 911 call directly, a secondary notification trigger may be activated from the subscriber's phone 300. The secondary notification trigger may be made by the subscriber, or by a secondary party, via an appropriate communication medium. For instance, the subscriber or secondary party may call a "1-800" number stored in the subscriber contacts, named "Emergency Contact Service" or suitable other similar nomenclature. The caller (i.e., subscriber or secondary party) can be made to listen to a brief recorded message describing the automatic notification service, and required to accept or decline use of the automatic notification service. Alternatively, no recorded message need be played.

To cancel routing of the notification messages, once the emergency 911 or accepted secondary notification call terminates, a recorded notification cancellation option voice message or short message service (SMS) text message is sent to the subscriber 300. As an example, a return call is made to a phone number stating that an emergency contact notification trigger came through, and asking for confirmation or authorization to cancel. For example, the subscriber 300 may be asked "to press '1' to confirm cancellation of the automatic emergency call notification." If the notification is cancelled, no notification will occur to any pre-designated emergency contacts.

If there is no response by the subscriber 300 to the cancellation confirmation request, the emergency call notification message will be sent to all phone numbers pre-designated by the subscriber 300. In disclosed embodiments, the emergency call notification message reports generally that the subscriber's phone was used to report an emergency event. The emergency call notification message preferably also includes the registered subscriber's name, and the time the emergency call was initiated and/or terminated. The emergency notification message preferably also includes the subscriber's location, either in a general manner (e.g., city and state) and/or in a more specific manner (e.g., with latitude/longitude and/or closest street address). In preferred embodiments the provision of location of the emergency caller to notified emergency contacts is configurable. The configurability of the option to provide location may include the ability to provide location information to some emergency contacts being notified, and not to others. The configurability of the option may even designate a location accuracy to be provided to the relevant notified emergency contact. For instance, some of the available location information may be provided while other location information is withheld from the notification. Thus, a more general location may be provided as only a city and state of the emergency caller, whereas a more accurate location may include not only the city and state of the emergency caller but their street address as well.

The emergency call notification message also preferably states, e.g., that this is only a notification that the subscriber's phone was used to call 911, but that this notification alone does not represent that the subscriber is in any danger, as the event reported may have been a false alarm, minor, and/or the event reported may not have involved the subscriber. Preferably the emergency call notification message also recommends that the emergency contact attempt to directly contact the subscriber first (after a reasonable delay) to avoid interfering with any potential police, medical and/or fire response. In this way, important information relevant to the subscriber having the emergency and known by the emergency contact may be passed to necessary personnel.

Emergency call notification to subscriber's personal emergency contacts as disclosed can be extended for use in a voice over Internet Protocol (VoIP) network.

The disclosed embodiments utilize otherwise conventional subscriber devices, e.g., wireless and/or VoIP devices. Thus, the subscribers are not required to purchase a new electronic device to utilize emergency call notification services as disclosed.

The present embodiments allow for subscriber wireless (portable) mobile support, and do not circumvent proven, government-approved PSAP network structure, as PSAPs have the best training to handle an emergency and contact the appropriate responder(s).

Whereas conventional monitoring services (e.g., personal response monitoring services) target a small market (e.g., the elderly or infirm), the disclosed embodiments target and support a much larger market including users of any age group, in any state of health, thus satisfying the needs of the general population.

The invention has particular applicability to wireless (cellular) phone subscribers who have loved ones that might be concerned about their location and/or well being. Target users would be wireless carriers already served by wireless E911 services who would offer emergency call notification services to their subscribers. The services may be subscribed to, e.g., on a monthly basis. The emergency call notification services not only enhance existing subscriber services, but also entice new subscribers to purchase new cell phone service as the cost can be considerably less than conventional personal emergency response monitoring services.

While the invention has been described with reference to the exemplary embodiments thereof, those skilled in the art will be able to make various modifications to the described embodiments of the invention without departing from the true spirit and scope of the invention.

What is claimed is:

1. A method of automatically notifying a pre-designated emergency contact relating to an emergency call, comprising:
   receiving an emergency call from a given subscriber device;
   transmitting, to said given subscriber device, a cancelation option message to optionally send a cancelation request to cancel generation of a contact notification message; and
   if said cancelation request is not received from said given subscriber device in response to said cancelation option message, determining at least one are-designated emergency contact to be automatically contacted subsequent to said receipt of said emergency call, generating said contact notification message to be sent to said at least one pre-designated emergency contact, and sending said generated contact notification message to said at least one pre-designated emergency contact.

2. The method of automatically notifying a pre-designated emergency contact relating to an emergency call according to dam 1, wherein:
   said generated contact notification message is sent via a pre-configured method.

3. The method of automatically notifying a pre-designated emergency contact relating to an emergency call according to claim 2, wherein said pre-designated emergency contact is one of:
   an SMS message;
   an email; and
   a voice over Internet Protocol (VoIP) call with pre-recorded message payload.

4. The method of automatically notifying a pre-designated emergency contact relating to an emergency call according to claim 2, wherein said pre-designated emergency contact is:
   an SMS message.

5. The method of automatically notifying a pre-designated emergency contact relating to an emergency call according to claim 2, wherein said pre-designated emergency contact is:
   an email.

6. The method of automatically notifying a pre-designated emergency contact relating to an emergency call according to claim 2, wherein said pre-designated emergency contact is:
   a voice over Internet Protocol (VoIP) call with pre-recorded message payload.

7. The method of automatically notifying a pre-designated emergency contact relating to an emergency call according to claim 1, wherein:
   said emergency call is received over a voice over Internet Protocol (VoIP) network.

8. The method of automatically notifying a pre-designated emergency contact relating to an emergency call according to claim 1, wherein:
   said contact notification message is sent via a voice over Internet Protocol (VoIP) network.

9. The method of automatically notifying a pre-designated emergency contact relating to an emergency call according to claim 1, wherein:
   said at least one pre-designated emergency contact is at least three emergency contacts.

10. Apparatus for automatically notifying a pre-designated emergency contact relating to an emergency call, comprising:
    means for receiving an emergency call from a given subscriber device;
    means for transmitting, to said given subscriber device, a cancelation option message to optionally send a cancelation request to cancel generation of a contact notification message; and
    means for determining said at least one pre-designated emergency contact to be automatically contacted subsequent to said receipt of said emergency call, generating said contact notification message to be sent to said at least one pre-designated emergency contact, and sending said generated contact notification message to said at least one pre designated emergency contact, if said cancelation request is not received from said given subscriber device in response to said cancelation option message.

11. The apparatus for automatically notifying a pre-designated emergency contact relating to an emergency call according to claim 10, wherein:
    said generated contact notification message is sent via a pre-configured method.

12. The apparatus for automatically notifying a pre-designated emergency contact relating to an emergency call according to claim 11, wherein said pre-designated emergency contact is one of:
    an SMS message;
    an email; and
    a voice over Internet Protocol (VoIP) call with pre-recorded message payload.

13. The apparatus for automatically notifying a pre-designated emergency contact relating to an emergency call according to claim 11, wherein said pre-designated emergency contact is:
an SMS message.

14. The apparatus for automatically notifying a pre-designated emergency contact relating to an emergency call according to claim 11, wherein aid pre-designated emergency contact is:
an email.

15. The apparatus for automatically notifying a pre-designated emergency contact relating to an emergency call according to claim 11, wherein:
said pre-configured method is a voice over Internet Protocol (VoIP) call with pre-recorded message payload.

16. The apparatus for automatically notifying a pre-designated emergency contact relating to an emergency call according to claim 10, wherein:
said emergency call is received over a voice over Internet Protocol (VoIP) network.

17. The apparatus for automatically notifying a pre-designated emergency contact relating to an emergency call according to claim 10, wherein:
said contact notification message is sent via a voice over Internet Protocol (VoIP) network.

18. The apparatus for automatically notifying a pre-designated emergency contact relating to an emergency call according to dam 10, wherein:
said at least one pre-designated emergency contact is at least three emergency contacts.

* * * * *